Aug. 4, 1970  E. S. PERKINS  3,523,295
APPARATUS FOR CORRECTING ERRORS IN NAVIGATION SYSTEMS
Filed April 3, 1968  2 Sheets-Sheet 1
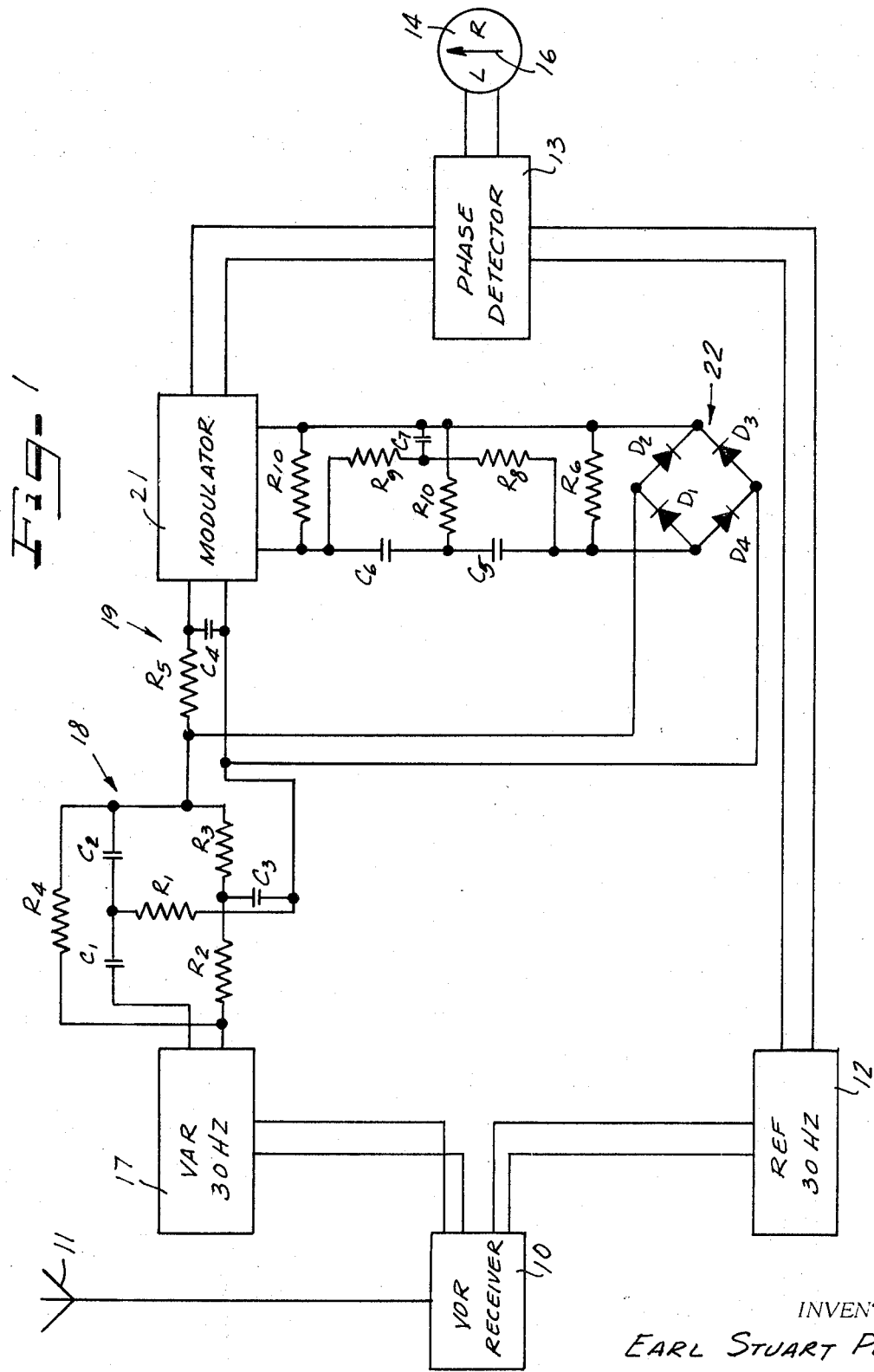
INVENTOR.
EARL STUART PERKINS

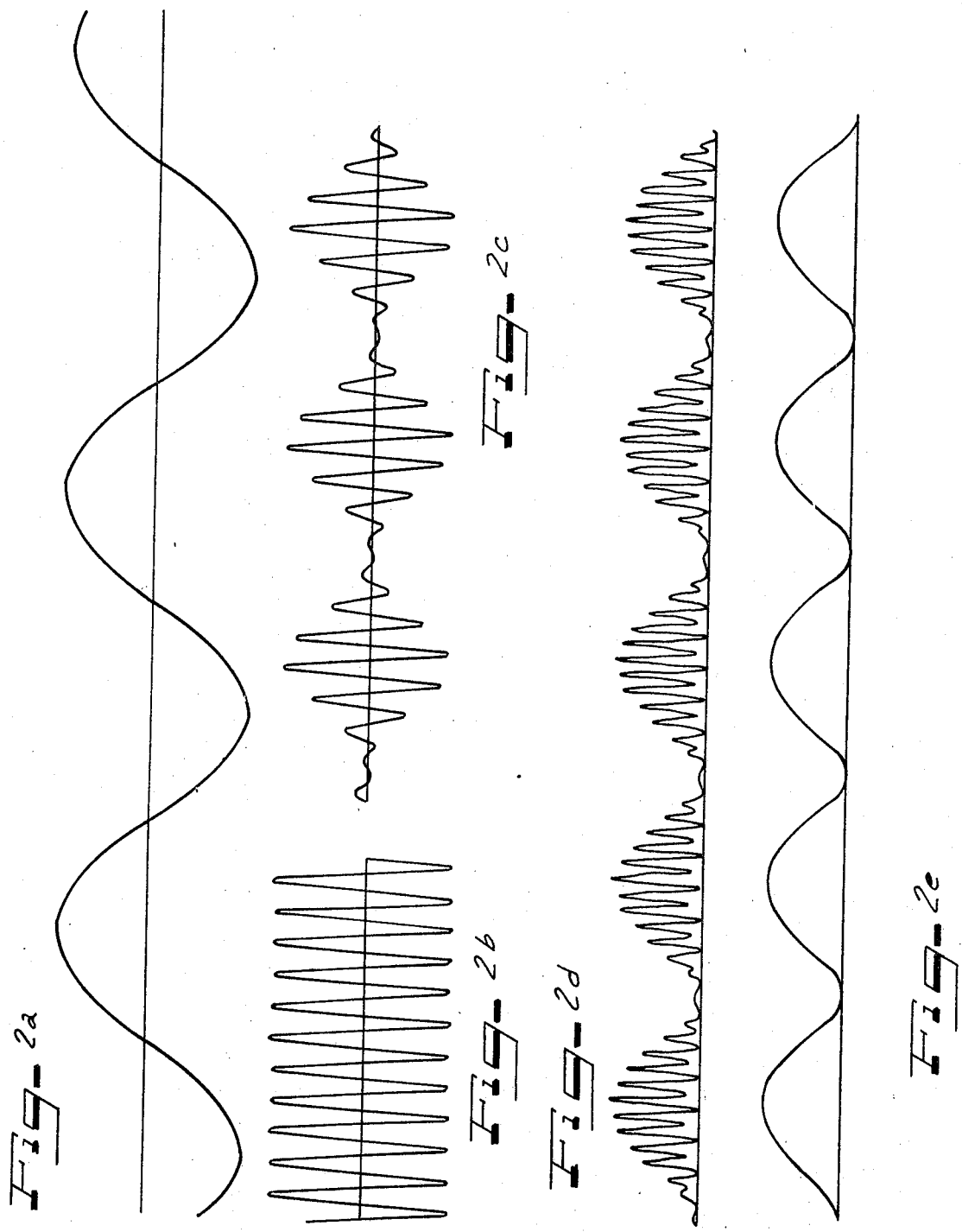

United States Patent Office 3,523,295
Patented Aug. 4, 1970

3,523,295
APPARATUS FOR CORRECTING ERRORS IN NAVIGATION SYSTEMS
Earl Stuart Perkins, Oakbrook, Ill., assignor to Butler National Corporation, Minneapolis, Minn., a corporation of Delaware
Filed Apr. 3, 1968, Ser. No. 718,412
Int. Cl. G01s *1/50;* H04b *1/12*
U.S. Cl. 343—106                     4 Claims

ABSTRACT OF THE DISCLOSURE

A navigation system for receiving and detecting VOR signals, for example, in which the variable 30 hertz signal is passed through a 15 hertz filter and then full-wave rectified to convert the 30 hertz signal into a 60 hertz signal. The 60 hertz signal is filtered out and the result is modulated on the variable 30 hertz signal which has not passed through the full-wave rectifier and 60 hertz filter. The output of the modulator is a corrected 30 hertz signal which accurately indicates the variable phase.

BACKGROUND OF THE INVENTION

Field of the invention

This invention relates in general to aircraft navigation systems and in particular to VOR receivers.

Description of the prior art

Aircraft navigation systems utilize VOR receivers in which a fixed reference 30 hertz cycle signal and a variable 30 hertz cycle signal are transmitted and received to give a line of bearing from the VOR transmitter. The phase between the reference signal and the variable phase signal indicate the bearing from station at the observer's position.

SUMMARY OF THE INVENTION

An improved VOR receiver system wherein the variable 30 hertz signal is passed through a 15 hertz filter and then through two channels to a modulator. The first channel full-wave rectifies the signal out of the 15 hertz filter and passes the detected signal through a 60 hertz filter to the modulator. The other input to the modulator is directly out of the 15 hertz filter through a 30 hertz phase corrector. A phase detector receives the reference signal and the output of the modulator to produce an accurate indication of the observer's position.

It is well known that present-day VOR systems which include transmitters and receivers produce output signals that are in error. Certain of these errors are caused by low-frequency modulation occurring on the variable 30 hertz signal. For example, so-called low-frequency scallops on the VOR signal can cause variations in the variable 30 hertz signal that produce errors when it is compared with the reference 30 hertz signal. Phase detectors produce errors if the amplitude of one of the signals being compared has a variable amplitude. The present invention detects the variable 30 hertz signal with its undesirable noise components, and passes it through a 15 hertz filter into a modulator. The modulator receives a second input from the output of the 15 hertz filter and passes it through a rectifier at the output of which is placed a 60 hertz filter. The output of the 60 hertz filter is fed to the modulator. The undesired noise on the variable 30 hertz signal will be removed in the modulator and the output will be a fixed amplitude 30 hertz variable signal which can be used as the signal to be compared with the reference 30 hertz signal. As is well known, the phase relationship between the variable and reference 30 hertz signals is indicative of the aircraft's position relative to the selected VOR radial. Thus, the present invention removes those errors caused by various interfering and undesired noise signals and produces a constant amplitude variable 30 hertz signal that will produce a much more accurate position signal at the output of the VOR system.

Other objects, features and advantages of the present invention will be readily apparent from the following detailed description of certain preferred embodiment thereof taken in conjunction with the accompanying drawings.

BRIEF DESCRIPTION OF THE DRAWINGS

FIG. 1 is a partially block and partially schematic view of the improved navigation system according to this invention; and FIGS. 2a–2e illustrate the various wave shapes in the navigation system of FIG. 1.

DESCRIPTION OF THE PREFERRED EMBODIMENTS

FIG. 1 illustrates a VOR receiver 10 which is connected to a suitable antenna 11. The receiver 10 has means for detecting the reference 30 hertz signal and the variable 30 hertz signal. The reference 30 hertz detector 12 receives an output from the VOR receiver 10 and supplies an input to a phase detector 13. The phase detector 13 produces an output which is fed to the left-right meter 14 which has an indicator 16.

A variable 30 hertz detector 17 receives an output from the VOR receiver 10 and supplies an input to a 15 hertz filter 18. A 30 hertz phase corrector 19 receives an output from the 15 hertz filter and supplies an input to a modulator 21. The modulator 21 may be of any conventional type which adds two signals of different frequencies.

The 15 hertz filter comprises the series capacitors C1 and C2 and a parallel branch comprising a resistor R1 and capacitor C3. A resistor R4 is connected in parallel with capacitors C1 and C2. Resistors R2 and R3 are connected in series with the other side of the line. The 30 hertz phase corrector 19 comprises a series resistor R5 and a parallel capacitor C4.

A second output from the 15 hertz filter 18 is connected to the full-wave rectifier 22 which comprises diodes D1, D2, D3, and D4. A resistor R6 is connected across the output terminals of the full-wave rectifier 22. A 60 hertz filter comprising series capacitors C5 and C6 and resistors R8 and R9, are connected in one leg of the output of the full-wave rectifier 22, and a capacitor C7 is connected from the junction points between resistors R8 and R9 to the other side of the output of the rectifier 22. Resistor R7 is connected across from between the capacitors C5 and C6 to the other side of the line. Resistor R6 is connected across the rectifier 22.

A parallel resistor R10 is connected from the capacitor C6 to the other side of the output of the full-wave rectifier 22. An input to the modulator 21 is connected across the resistor R10.

The output of the modulator 21 is supplied to the phase detector 13.

In the particular embodiment according to this invention, the following conponent values were used:

R1—10K ohms          C6—1 microfarad
R2—20K ohms          C7—2 microfarads
R3—20K ohms          R7—350 ohms
R4—100K ohms         R8—2.7K ohms
R5—15.5K ohms        R9—2.7K ohms
C4—0.36 microfarad   C1—0.5 microfarad
C5—1 microfarad      C2—0.5 microfarad At the antenna 11 the wave forms shown in FIGS. 2a and 2b would be present. At the output of the reference 30 hertz detector 12 the wave form shown in FIG. 2b would be present.

At the output of the 15 hertz filter 18 the wave form of FIG. 2c would be present.

At the output of rectifier 22 the wave form of FIG. 2d would be present and across resistor R10 would appear the wave form of FIG. 2e.

Wave form of FIG. 2a comprises low frequency noise. The wave form of FIG. 2b comprises the 30 hertz signal. The wave form of FIG. 2c comprises the addition of wave forms from FIGS. 2a and 2b less 15 hertz signals which have been removed by filter 18. The wave form shown in FIG. 2d comprises the rectified wave form of FIG. 2c less 30 hertz.

The output of modulator 21 is of the form shown in FIG. 2b and comprises the correct 30 hertz variable phase signal. It is to be realized, however, that the phase relationship between the outputs of reference detector 12 and modulator 21 depends on the aircraft's position relative to the selected radial.

The phase detector 13 produces an output which accurately indicates the aircraft's position relative to the ground transmitter.

Although I have herein set forth my invention with respect to certain specific principles and details thereof, it will be understood that these may be varied without departing from the spirit and scope of the invention as set forth in the hereunto appended claims.

I claim as my invention:

1. A navigation receiver for receiving and detecting a pair of signals which have a phase relationship indicative of position comprising a reference signal detector detecting a reference signal, a phase detector receiving the output of the reference signal detector, a variable signal detector detecting a variable signal, a modulator receiving the output of the variable signal detector, rectifier receiving an output of the variable signal detector, a first filter connected to the output of the rectifier and tuned to block signals at twice the reference signal frequency, the output of the first filter connected to the modulator and a second filter connected between the variable signal detector and the modulator and tuned to block signals equal to one-half the reference signal frequency.

2. A navigation receiver according to claim 1 comprising a phase shifter connected between the second filter and the modulator for correcting the phase of the reference signal frequency.

3. A navigation receiver according to claim 2 wherein said first filter comprises a pair of capacitors connected in series in one side of the line between the rectifier and the modulator, a pair of resistors connected in parallel with the pair of capacitors, a third capacitor connected between the junction point of the pair of resistors and the other side of the line, and a third resistor connected between the junction point of the capacitors and the other side of the line.

4. A navigation receiver according to claim 1 wherein the second filter comprises fourth and fifth capacitors in series in one line, a fourth resistor connected from the fifth capacitor to the other line, a fifth resistor and a sixth capacitor connected in series with one end of the fifth resistor connected to the junction point between the fourth and fifth capacitors, sixth and seventh resistors connected in series in the other line, and one side of the sixth capacitor connected to the junction point between the sixth and seventh resistors.

References Cited

UNITED STATES PATENTS

| | | | |
|---|---|---|---|
| 2,113,212 | 4/1938 | Landon | 325—476 |
| 3,358,231 | 12/1967 | Baganoff | 324—83 |

RICHARD A. FARLEY, Primary Examiner

H. C. WAMSLEY, Assistant Examiner

U.S. Cl. X.R.

325—476; 343—107